United States Patent [19]

Tomosada

[11] 4,248,284
[45] Feb. 3, 1981

[54] HAND SAW WITH AN INTERCHANGEABLE SAW BLADE
[75] Inventor: Masaaki Tomosada, Ono, Japan
[73] Assignee: Razor Saw Manufacturing Co., Ltd., Ono, Japan
[21] Appl. No.: 74,016
[22] Filed: Sep. 10, 1979

[30] Foreign Application Priority Data

Apr. 17, 1979 [JP] Japan .............................. 54-51453[U]

[51] Int. Cl.³ ............................................ B27B 21/00
[52] U.S. Cl. ............................... 145/31 R; 145/108 R
[58] Field of Search ........................... 145/31 R, 108 R

[56] References Cited

U.S. PATENT DOCUMENTS

| 183,805 | 10/1876 | Holden | 145/108 R |
| 1,541,611 | 6/1925 | Arnold | 145/108 R |
| 3,480,055 | 11/1969 | La Pointe | 145/108 R |

FOREIGN PATENT DOCUMENTS 1264649  2/1972  United Kingdom ................ 145/31 R Primary Examiner—Othell M. Simpson
Assistant Examiner—J. T. Zatarga
Attorney, Agent, or Firm—Amster, Rothstein & Engelberg

[57] ABSTRACT

A hand saw with an interchangeable saw blade comprising a saw blade with a tongue a U-shaped reinforcing member for reinforcing the saw blade and the tongue, and a molded handle including a blade receiving opening. The handle includes a set screw which protrudes into notches formed in the tongue of the blade and the reinforcing member to lock the blade to the handle. The notches in the tongue and the reinforcing member are arranged so that only the notch in the tongue of the blade engages the tip of the set screw, thereby ensuring a firm clamping of the saw blade to the handle. The opening for receiving the tongue of the blade is defined by ribs formed on the handle.

3 Claims, 6 Drawing Figures

HAND SAW WITH AN INTERCHANGEABLE SAW BLADE

FIELD OF THE INVENTION

This invention relates to hand saws with interchangeable saw blades.

BACKGROUND OF THE INVENTION

There has been known various types of hand saws with interchangeable saw blades. However, the conventional hand saws with interchangeable saw blades are disadvantageous either in that they are complicated in structure due to the necessary arrangement for providing saw blade interchangeability or in that the saw blade has play in the mounting handle because of the difficulty of rigidly and interchangeably mounting the blade to the handle.

SUMMARY OF THE INVENTION

Accordingly, an object of the present invention is to provide a hand saw with an interchangeable saw blade simple in structure and with no play between the blade and the handle.

With the above object in view, the hand saw with an interchangeable saw blade according to the present invention comprises a saw blade with a tongue, a reinforcing member for increasing the rigidity of the saw blade and the tongue, and a molded handle including an opening for receiving therein the tongue of the saw blade together with the reinforcing member. The tongue of the saw blade has a notch formed in the edge portion thereof opposite the back of the tongue. The reinforcing member has a substantially U-shaped cross section capable of being placed over the back of the saw blade in such a position that the inner surface of the bight portion of the U-shaped reinforcing member is in contact with the back of the saw blade including the back of the tongue and that the inner surfaces of the substantially parallel leg portion of the U-shaped reinforcing member are in contact with the side surfaces of the tongue and the saw blade. The reinforcing member includes notches formed in the parallel leg portions of the "U" at a location corresponding to the notch of the tongue, thereby to provide a composite recess for securing the tongue and the reinforcing member together to the handle. The molded handle which is preferably made of a plastic material receives in its opening the tongue and the reinforcing member with a close tolerance therebetween. The handle includes a set screw thread engaged with the handle at a location corresponding to the composite recess of the blade and the tongue when they are fully inserted into the opening of the handle. The opening in the handle is defined by a plurality of ribs integrally molded in the handle. Preferably, the ribs extend substanially perpendicularly and inwardly from shell walls of the handle defining the outer configuration of the handle, and include at least two higher spaced ribs extending between the two opposing shell walls and at least two shorter ribs spaced apart from the higher ribs and extending inwardly in an opposing relationship with respect to one another. The higher ribs form supports for edges of the reinforcing member and the tongue and the shorter ribs form supports for sides the reinforcing member and the tongue therein between their opposing ends. The notches in the tongue and the reinforcing member are arranged such that, when the set screw is inserted into the notches, the inner end of the set screw engages only the tongue. Preferably, the notch in the tongue is substantially of rectangular shape having a certain depth and width, the notches formed in the reinforcing member have depths deeper than that of the tongue notch and a widths substantially equal to that of the notch in the tongue when the width of the tongue is substantially equal to the depth of the U-shaped cross section of the reinforcing member.

BRIEF DESCRIPTION OF THE DRAWINGS

The invention will now be described in conjunction with the preferred embodiment of the present invention shown in the accompanying drawings, in which.

DESCRIPTION OF THE PREFERRED EMBODIMENT

Figure 1:
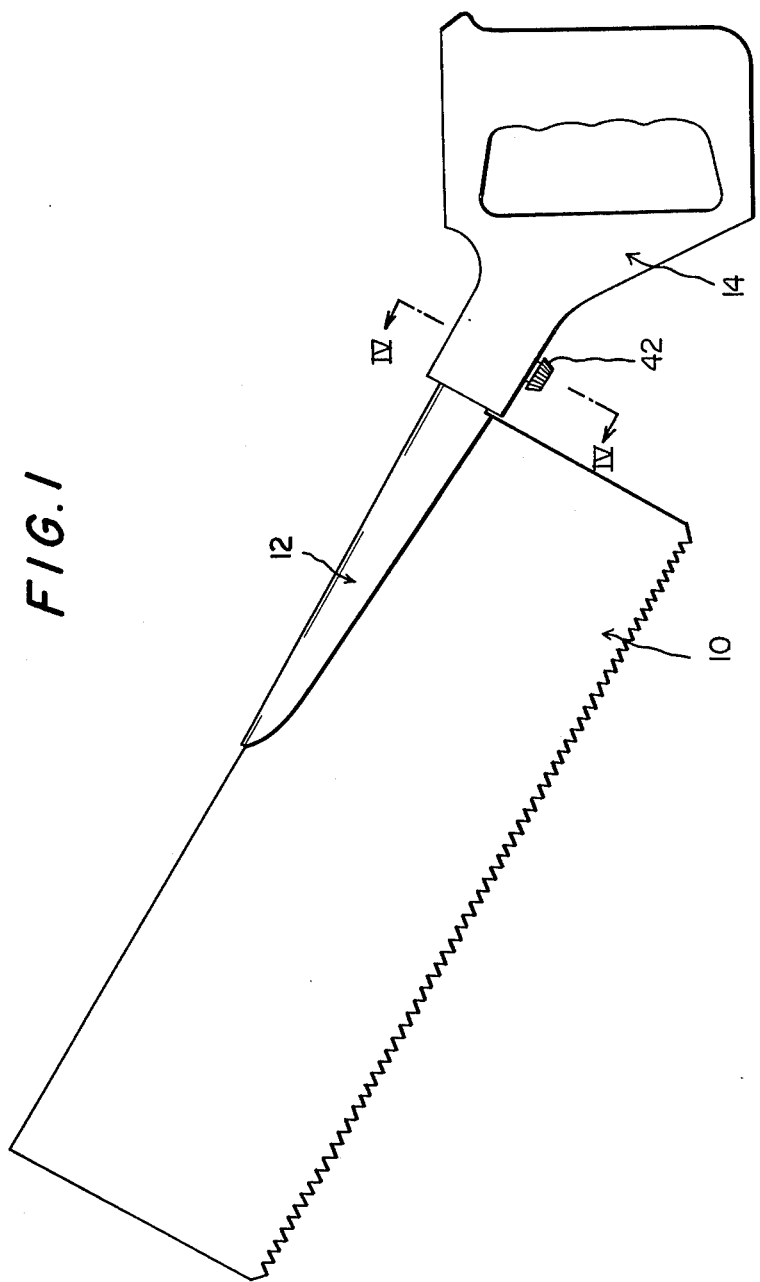
FIG. 1 is a plan view of a hand saw with an interchangeable saw blade constructed in accordance with the present invention.

Referring now to the drawings and in particular to FIG. 1 thereof, a hand saw with an interchangeable saw blade comprises a saw blade 10 made of a relatively thin steel sheet, a reinforcing member 12 for increasing the rigidity of the saw blade 10, and a handle 14 mounted to the saw blade 10 and the reinforcing member 12.

Figure 2:
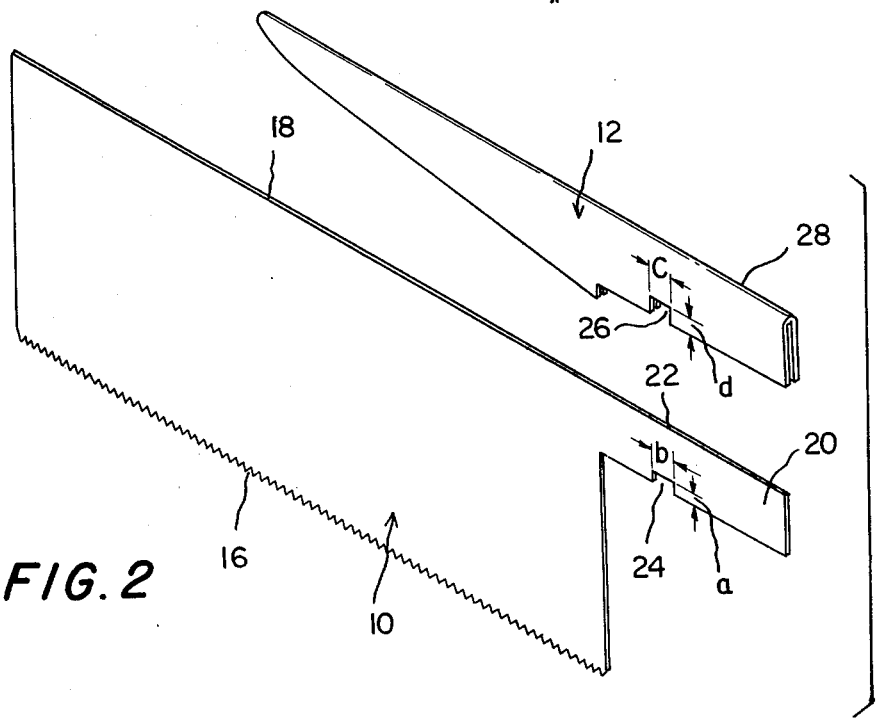
FIG. 2 is an exploded perspective view of a saw blade and a reinforcing member of the present invention.

The saw blade 10 is more clearly shown in FIG. 2, and includes saw teeth 16, a back 18 and a tongue 20. The tongue 20 is an extended portion of the saw blade 10 and includes a back 22 continuous with the back 18 of the saw blade 16. At the edge of the tongue 20 opposite to the back 22, or the lower edge in FIG. 2, a substantially rectangular notch 24 having a predetermined depth a and a predetermined width b is formed.

Figure 6:
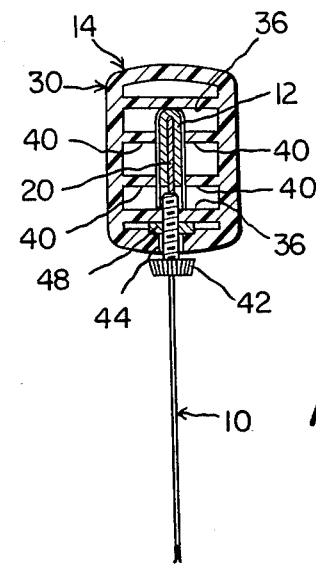
FIG. 6 is a cross sectional view taken along the line VI—VI of FIG. 1 with the saw blade and the reinforcing member mounted to the handle.

The reinforcing member 12 may be made of a relatively thick elongated sheet metal folded along its longitudinal axis to provide a substantially U-shaped cross section. The width of the folded reinforcing member 12, or the height of the "U" of the reinforcing member 12, is preferably equal to the width of the tongue 20 plus thickness of the sheet material of the reinforcing member 12. In other words, it is preferable that the depth of the "U" of the reinforcing member 12 be equal to the width of the tongue 20 so that the edges of the tongue 20 and the member 12 lie in a common plane. The reinforcing member 12 also comprises two rectangular notches 26 formed in the free ends of the leg portions of the "U" at a location corresponding to the notch 24 formed in the tongue 20. The widths c of the notches 26 are equal to the width b of the notch 24 in the tongue 20, and the depths d of the notches 26 are substantially equal to each other but slightly deeper than the depth a of the notch 24 in the tongue 20. Thus, when the reinforcing member 12 is placed in position over the saw blade 10, the bight portion or the back 28 of the U-shaped reinforcing member 12 is laid on the backs 18 and 22 of the saw blade 10 and tongue 20 and extends therealong to cover all the back 22 of the tongue 20 and a substantial portion of the back 18 of the saw blade 10. The parallel leg portions of the "U" of the reinforcing member 12 extend along the side faces of the saw blade 10 and the tongue 20 to sandwich substantially the entire side faces of the tongue 20 and a part of side faces of the blade 10. The reinforcing member 12 thus increases the rigidity of the saw blade 10 which otherwise may easily be flexed thickwise. Since the notches 26 in the reinforcing member 12 are slightly deeper than the notch in the tongue 20 and the width of the tongue 20 is substantially equal to the depth of the "U" of the reinforcing member 12, the bottom edge of the notch 24 slightly projects from the sandwiching bottom edges of the notches 26 when the reinforcing member 12 is placed in position over the saw blade 10 as illustrated in FIGS. 4 and 6.

Figure 3:
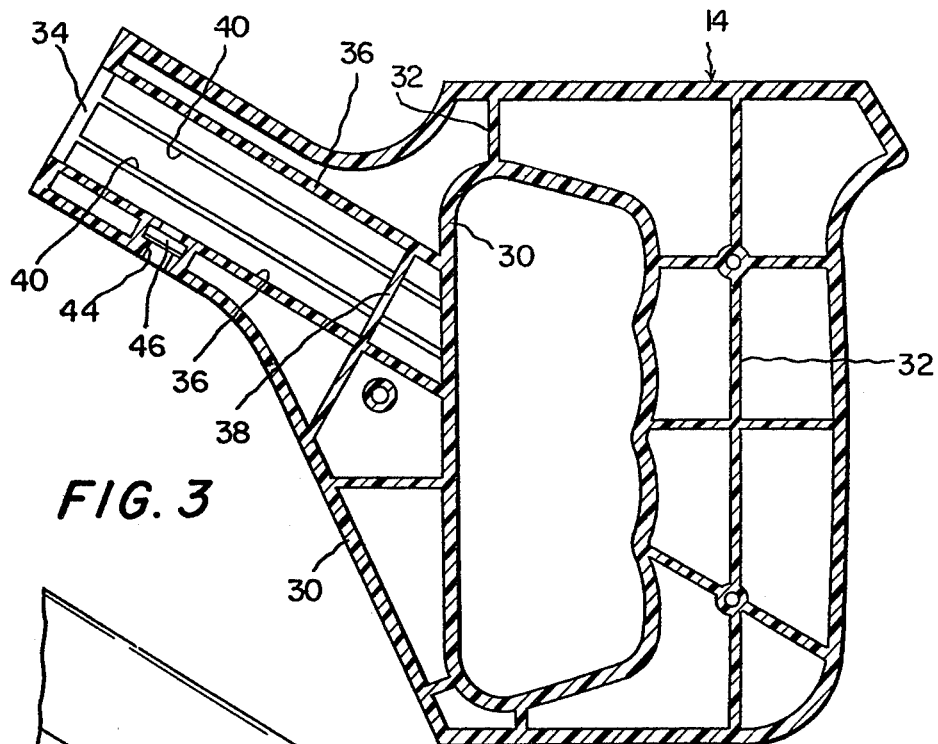
FIG. 3 is a longitudinal sectional view of a handle of the present invention taken along the center line of the handle.
Figure 4:
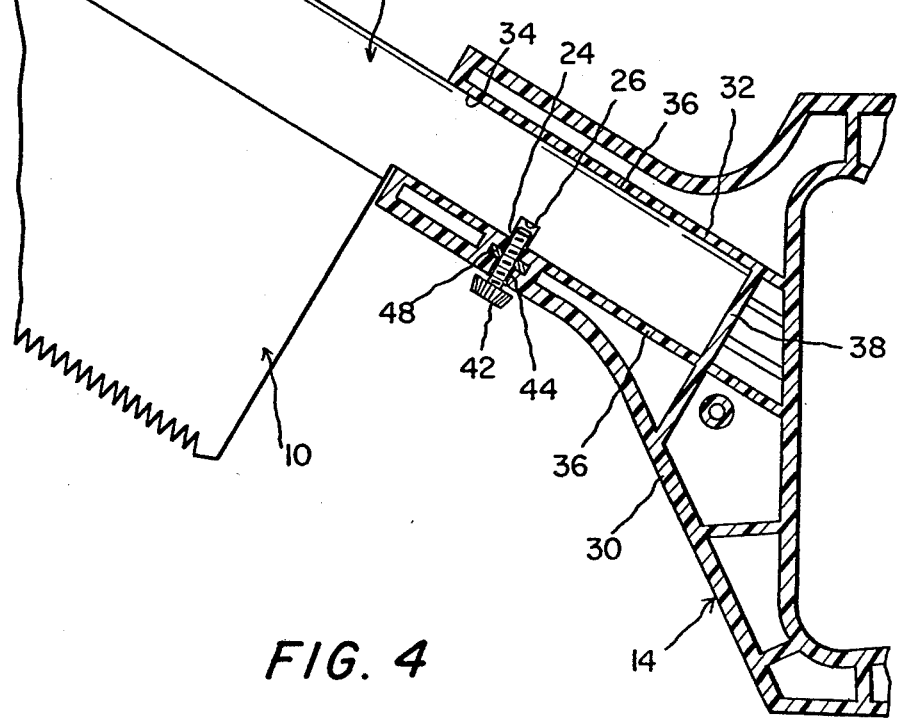
FIG. 4 is a partial view similar to FIG. 3 with the blade, with the aid of the reinforcing member, mounted in the handle.

In FIG. 4, the handle 14 of the hand saw of the present invention is shown in cross section along the center line thereof. The handle 14 is preferably made of a plastic material molded in two substantially symmetrical pieces. In assembly, the molded pieces may be firmly bonded or secured by any suitable mechanical means such as screws and nuts. The handle 14 shown in FIG. 3 in cross section is one made by bonding two substantially symmetrical molded pieces, each of which comprises shell walls 30 defining the outer configuration of the handle 14 and a plurality of ribs 32 extending integrally from the shell walls 30 into the space surrounded by the shell walls 30.

The handle 14 has formed therein an opening 34 for receiving the tongue 20 of the saw blade 10 with the reinforcing member 12 placed thereon with a relatively close tolerance between the handle 14 and the outer surface of the reinforcing member 12. As clearly seen from FIGS. 3 to 6, the opening 34 is defined by some of the ribs 32 integrally molded with the shell walls 30. In the illustrated embodiment, the ribs for defining the opening 34 for receiving the tongue 20 and the reinforcing member 12 are ribs 36, 38 and 40 extending substantially perpendicularly and inwardly from the inner face of the shell walls 30. The ribs 36 and 38 are higher than the ribs 40 and extend from one shell wall 30 to the opposing parallel shell wall 30 across the interior space within the shell wall 30. The higher ribs 36 and 38 may be formed by bonding the abutting ends of the ribs upon assemblage of the handle 14 from the two molded pieces. The higher ribs 36 and 38 thus define a space therebetween and provide supports for three edges of the reinforcing member 12 inserted in the opening 34. The ribs 40 are shorter in height than the ribs 36 and 38, and are disposed between the two parallel spaced ribs 36 spaced apart from the ribs 36 and from each other. In the illustrated embodiment, the shorter ribs 40 comprise two pairs of opposing ribs extending from the shell wall 30 of the handle 14. Since the ribs 40 are shorter than the higher ribs 36 and 38 by a distance of one half of the thickness of the folded reinforcing member 12, a space corresponding to the thickness of the member 12 is defined between the opposing end of the shorter ribs 40 when the handle is assembled. These opposing ends of the shorter ribs 40 provide supports for the sides of the reinforcing member 12. It is apparent from the above description that the opening 34 for receiving the tongue 20 and the reinforcing member 12 is defined between the major surfaces of the higher ribs 36 and 38 and between the opposing ends of the pairs of the shorter ribs 40.

The handle 14 also comprises a set screw 42 threadably engaged with the handle 14 and capable of being inserted into the notches 24 and 26 of the tongue 20 and the reinforcing member 12 inserted in the opening 34 of the handle 14. In order to receive the set screw 42, the handle 14 has a bore 44 formed through the shell wall 30 and one of the higher ribs 36 at the location in registry to the notches 24 and 26 when the tongue 20 and the reinforcing member 12 are fully inserted in the receiving opening 34. The bore 44 is defined by a cylindrical rib disposed between the shell wall 30 and the higher rib 36. The cylindrical rib has formed therein an annular groove 46 into which a nut 48 thread engageable with the set screw 42 is fitted and secured against rotation.

Figure 5:
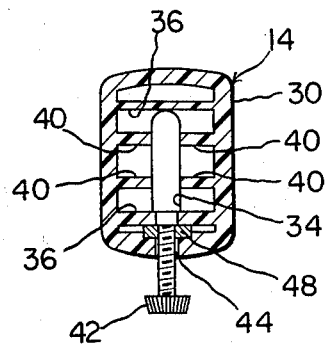
FIG. 5 is a cross sectional view taken along the line VI—VI of FIG. 1 with the saw blade and the reinforcing member disassembled from the handle.

When it is desired to dismount the saw blade 10 from the handle 12 of the hand saw illustrated in FIG. 1, the set screw 42 is loosened so as to retract the inner end thereof from the notches 24 and 26 to the position illustrated in FIG. 5. With the set screw 42 in this position, the saw blade 10 together with the reinforcing member 12 can easily be pulled out of the opening 34 in the handle 14. Then the reinforcing member 12 can be separated from the saw blade 10 to be used with another saw blade having a tongue similar to the tongue 20. In some cases, it will only be desired to disassemble the saw blade from the handle 14 for storage purposes for example. When it is desired to attach a new saw blade or the same saw blade 10, the tongue 20 of the blade is inserted into the opening 34 in the handle 14 together with the reinforcing member 12 until their iserted ends abut against the rib 38. In this position, the notches 24 and 26 in the tongue 20 and the reinforcing member 12 respectively are in alignment with each other and with the set screw 42 inserted into the bore 44. Therefore, the rotation of the set screw 42 in the clockwise direction causes the inner end of the set screw 42 to protrude into and engage the notches 24 and 26 as illustrated in FIG. 4.

Since the widths of the notches 24 and 26 are selected so that the notches 24 and 26 closely fit the periphery of the screw 42, there will be only slight play in the longitudinal direction of the saw blade 10 between the blade and the handle. This slight play, however, can be completely eliminated by tightly rotating the set screw 42 until its inner end engages the bottom edge of the notch 24 of the tongue 20 which projects from the bottom edges of the notches 26 and urges the back 28 of the reinforcing member 12 against the upper higher rib 36 as best shown in FIGS. 4 and 6. Since the set screw 42 engages only the tongue 20 of the saw blade 10, the tongue 20 is firmly clamped between the screw 42 and the reinforcing member 12 which in turn is supported by the higher rib 36 of the handle 14, thereby ensuring that the saw blade 10 is securely mounted in the handle 14 without any play therebetween.

It is to be noted that the above rigid mounting of the blade to the handle is achieved with a simple reliable arrangement by a simple easy operation. The handle 14 of the hand saw of the present invention employs a simple, easy-to-manufacture structure for defining the opening for receiving the tongue of the saw blade. As best seen in FIGS. 3 to 6, the opening 34 for the reception of the tongue 20 is defined by the plurality of ribs 36, 38 and 40 which need only a relatively simple molding die and a single molding operation and which provide sufficient mechanical strength necessary for firmly supporting the mounted saw blade 10. Also since the handle 14 is made by the molding technique, the handle 14 is light in weight and durable.

What is claimed is:

1. A hand saw with an interchangeable saw blade comprising, in combination:

a saw blade with a tongue, said tongue having a notch formed in the edge opposite the back of the tongue;

a reinforcing member for increasing the rigidity of said saw blade and said tongue, said reinforcing member having a substantially U-shaped cross section capable of being placed over the back of the saw blade with the inner surface of the bight portion of the "U" in contact with the backs of said tongue and said saw blade and the inner surfaces of the leg portions of the "U" in contact with the side faces of said tongue and said saw blade, said reinforcing member having notches formed in the leg portions of the "U" at a location corresponding to said notch in said tongue;

a molded handle having an opening for receiving said tongue of the saw blade with said reinforcing member placed on the tongue and the blade with a close tolerance between the handle and said reinforcing member, said handle including a set screw threadedly engaged with the handle at the location corresponding to said notches in the tongue and the reinforcing member when said tongue and the reinforcing member are fully inserted in said opening, said opening being defined by a plurality of ribs integrally formed with said mold handle, and said notches in said tongue and said reinforcing member being arranged such that when said set screw is thread-inserted into the handle, its inner end engages only said tongue of the blade within said notch.

2. A hand saw as claimed in claim 1, wherein said notch in the tongue is of a rectangular shape of a predetermined depth and a predetermined width, said notches in the reinforcing member having depths deeper than that of said notch in the tongue and widths substantially equal to that of said notch in the tongue, and the width of said tongue being substantially equal to the depth of said U-shaped cross section of the reinforcing member.

3. A hand saw as claimed in claim 1 or 2, wherein said ribs defining said opening for receiving the tongue extend substantially perpendicularly and inwardly from shell walls defining the outer configuration of said handle, and said ribs include at least two higher ribs extending between the two opposing shell walls to define supports for the edges of said tongue and said reinforcing member, and at least two shorter ribs spaced apart from said higher ribs and extending inwardly from said two opposing shell walls in an opposing relationship to define supports for the sides of said tongue and said reinforcing member between their opposing ends.

* * * * *